United States Patent
Gurumoorthy et al.

(10) Patent No.: US 7,802,083 B2
(45) Date of Patent: Sep. 21, 2010

(54) UTILIZATION BASED INSTALLATION ON A COMPUTING SYSTEM

(75) Inventors: Nagasubramanian Gurumoorthy, Portland, OR (US); Michael Rhodehamel, Portland, OR (US); Arvind Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 779 days.

(21) Appl. No.: 11/613,317

(22) Filed: Dec. 20, 2006

(65) Prior Publication Data

US 2008/0154805 A1    Jun. 26, 2008

(51) Int. Cl.
*G06F 9/445* (2006.01)
*G06F 15/173* (2006.01)

(52) U.S. Cl. .............................. 713/1; 713/2; 709/223; 709/224; 717/120; 717/170; 717/176; 717/177; 717/178

(58) Field of Classification Search ............ 713/1, 713/2; 709/223, 224; 717/120, 170, 176–178
See application file for complete search history.

(56) References Cited

U.S. PATENT DOCUMENTS

| | | | | |
|---|---|---|---|---|
| 2002/0152305 | A1* | 10/2002 | Jackson et al. | 709/224 |
| 2006/0130045 | A1* | 6/2006 | Wesley et al. | 717/168 |
| 2007/0021116 | A1* | 1/2007 | Okita et al. | 455/428 |
| 2007/0174683 | A1* | 7/2007 | Gehring et al. | 714/12 |
| 2008/0233943 | A1* | 9/2008 | Okita et al. | 455/419 |

\* cited by examiner

*Primary Examiner*—Abdelmoniem Elamin
(74) *Attorney, Agent, or Firm*—Schwabe, Williamson & Wyatt, P.C.

(57) ABSTRACT

Methods, apparatuses, articles, and systems for performing an installation by a client system at a time when the client system is predicted to be below a level, are disclosed. The installation may be a software or a patch. In various embodiments, the methods, apparatus et al may include performance of the adaptive prediction, and the adaptive prediction may be performed by a learning algorithm. In other embodiments, the methods et al may also develop a model of the client system's utilization by observing and recording metrics of hardware and software utilization over time.

24 Claims, 6 Drawing Sheets

UTILIZATION BASED INSTALLATION ON A COMPUTING SYSTEM

TECHNICAL FIELD

Embodiments relate to the field of data processing, in particular, to methods and apparatuses for installing and/or patching software applications on computing systems.

BACKGROUND

Continuous advances in processing speed, storage size, and networking have allowed for the development of applications, applications suites, and platforms of increasing complexity. Often such software components contain bugs or security flaws which must be corrected to ensure that the enterprise computing environment runs efficiently and securely. Patching of software occurs with increasing frequency and doing so often requires the user to stop their normal business activities to install a software patch or to allow someone else to install the patch on their client system. Often these patches require a reboot of the system which further impacts productivity. Compounding the issue, users often have the ability to delay the patch which can make enterprise networks vulnerable if critical updates are delayed. Additionally, the downloading and install of a patch or software update may require the client system to be connected to the enterprise network which is a problem for mobile devices which are not constantly connected. Many of these issues exist not only for new software installs as well as updates and patches.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for receiving, by a computer system, an instruction to perform an installation; and performing, by the computer system, the installation at a selected time, the selected time determined based at least in part on a time when the computer system's utilization is predicted to be below a utilization level, and the predicting of the time when the computer system's utilization will be below the utilization level is adaptively performed.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
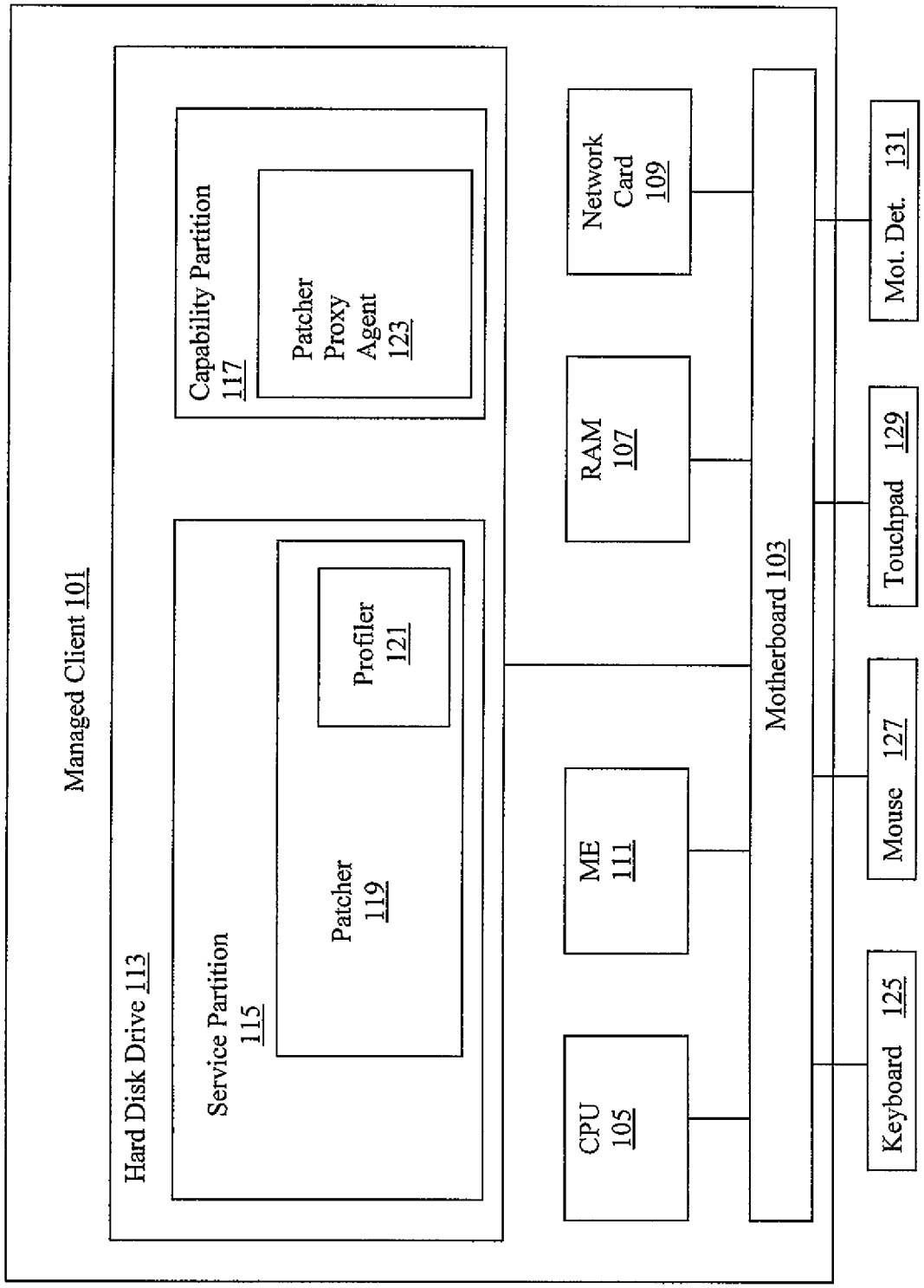
FIG. 1 shows a managed client with a patcher incorporated with the teachings of the invention, in accordance with various embodiments.

FIG. 1 illustrates a managed client system in accordance with various embodiments of the present invention. Managed client 101 may include motherboard 103 which may provide connections for central processing unit (CPU) 105, Random Access Memory (RAM) 107, network card 109, management engine 111 (e.g., a management microcontroller), and hard disk drive 113. Hard disk drive 113 may be partitioned to include service partition 115 and capability partition 117, among other partitions. Service partition 115 may include installer or patcher 119 (hereinafter, simply "patcher") which may include profiler/learner 121. Capability partition 117 may include patcher proxy agent 123.

Additionally, managed client 101 may have various peripherals attached such as, for example, keyboard 125, mouse 127, touchpad 129, and motion detector 131. In embodiments, other peripheral devices may be attached such as, for example, printers, scanners, personal data assistants (PDA), rollerballs, joysticks, retinal scanners, fingerprint scanners, and monitors. It will be apparent to one of ordinary skill in the art that other peripheral devices not listed above may be attached to managed client 101.

Profiler/learner 121 may monitor events as they occur on managed client 101 to develop a database of usage statistics particular to managed client 101. Profiler 121 may record incidents when managed client 101 is powered up, when it is powered down, when it goes into a soft sleep mode, when it enters a deep sleep mode, and when it awakes from either soft sleep or deep sleep. In embodiments, profiler 121 may observe by listening to various power up, power down, and sleep messages from an operating system running on capability partition 117.

Additionally, profiler 121 may observe client 101 hardware utilization at periodic intervals and record these observations. Monitored hardware utilization may include, but is not limited to, CPU 105 utilization, RAM 107 utilization, network card 109 utilization, and hard disk drive 113 utilization. Profiler 121 may also observe and record application usage which may include the numbers of active applications and processes over time. In embodiments, profiler 121 may observe the hardware utilization by accessing CPU 105, hard disk drive 113, RAM 107, and network card 109 directly via appropriate interfaces such as, but not limited to, performance monitor type interfaces.

In embodiments, profiler 121 may observe measurements of active user interaction with managed client 101. To this end it may, for example, observe and record the amount of interactivity associated with input/output devices or peripherals such as, for example, keyboard 125, mouse 127, touchpad 129, and/or motion detector 131. In embodiments, it may observe the level of human interaction with other input/output devices or peripherals not listed above.

In embodiments, the profiler may observe and record the utilization of other components. In embodiments, it may observe and record only a subset of the hardware utilizations listed above.

Based on the observations and recordings made by profiler 121, patcher 119 may build a rule set which may include usage patterns such as ranges of times when the utilization levels of CPU 105, RAM 107, network card 109, and hard disk drive 113 are above a certain high level; ranges of times when the utilization of those components are below another low level, and ranges of time when the utilization of those components are between the two levels. The rule set may also include ranges of times when client 101 is powered down; when it is powered up; when it is in soft sleep mode; and when it is in deep sleep mode. The rule set may also include ranges of times when application usage is above a certain high level, ranges of times when it is below another low level, and ranges of times when application usage is between the two levels.

In embodiments, the rule set may include ranges of times when the user interaction is above a certain high level; ranges of time when the interaction is below another low level, and ranges of times when the interaction level is between those two levels. In embodiments, such interaction levels may be characterized by, for example, incidents of the utilization of keyboard 125, mouse 127, touchpad 129, and/or motion detector 131 being above a certain high level; ranges of times when the utilization of any one, some or all of those components being below another low level, and ranges of time when the utilization of any one, some, or all of those components being between the two levels.

In embodiments, a rule set may be user-specific; profiler 121 may observe, record and build a rule set based upon each user's individualized usage of and/or interaction with client 101. This may be important in computing environments where multiple users share the same computer, for example in a call center. In embodiments, a user's individualized rule set may be migrated to another client system if and when the user logs onto a different client system.

In various embodiments, profiler 121 may go through an initial learning cycle during which time the rule set may be initially developed. The time length of the learning cycle may be a configurable administrative policy set by a user of client 101, or it may be set by an administrator via a management console (not shown), or it may be set during manufacturing of client 101 and be nonconfigurable after that point. In various embodiments, the time length of the learning cycle may be pre-set during manufacturing but configurable at a later time. In other embodiments, the length of time may be set dynamically depending on, for example, the amount of variation in utilization of client 101 observed by profiler 121 during an initial phase of the learning cycle.

In various embodiments, profiler 121 may continue to observe client 101 even after the initial learning period. In so doing, it may track changes in the usage of client 101.

Figure 2:
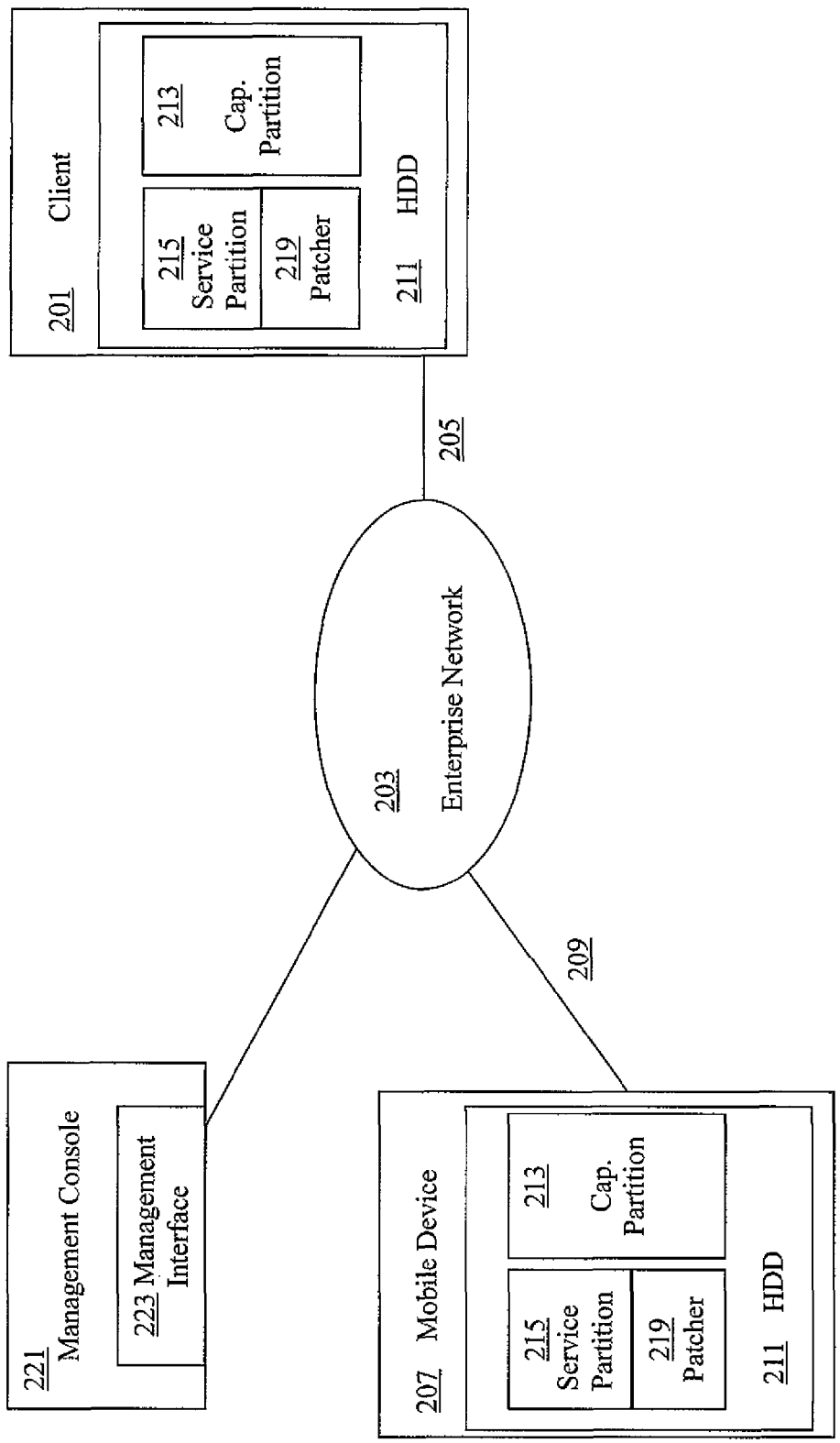
FIG. 2 shows an enterprise network including a management console and several managed client systems each with the patcher installed in accordance with various embodiments of the present invention.

FIG. 2 shows an enterprise network in accordance with various embodiments of the present invention. Client 201 may be connected to enterprise network 203 via wired network connection 205. Mobile device 207 may be connected to enterprise network 203 via wireless network connection 209. Client 201 and mobile device 207 may each have installed on them hard disk drives 211 which may be partitioned into capability partitions 213 and service partitions 215 using known partitioning techniques. Service partitions 215 may have patchers 219 loaded onto them. Patchers 219 may have a profiler/learner installed therein (not shown). Also shown in FIG. 2 is Management console 221 which may contain management interface 223.

Management interface 223 may, in various embodiments, be a standard manageability interface such as WS-MAN or CIM as well as other standard or non-standard manageability interfaces.

In various embodiments, a command may be entered into management console 221 to instruct client 201 and mobile device 207 to download and install a software patch. Management interface 223 may, in embodiments, communicate with patchers 219 of service partitions 215 via enterprise network 203. In embodiments, authentication and encryption may be employed to secure the communication between management console 221 and client 201 and mobile device 207. Authentication and encryption techniques are well known in the art and will not be further described.

In embodiments, the command issued by management console 221 may be to download a patch only. In other embodiments, the command issued by management console 221 may be to install an already-downloaded patch. In still other embodiments, the command may be to download the software at a certain time, and install the download at a different time.

In embodiments, the commands issued to client 201 and mobile device 207 may be to download and install a software file other than a software patch. In embodiments, the software may be initially hosted on management console 221. In alternative embodiments, the software may be initially hosted on a device connected to enterprise network 203 other than management console 221 or, in alternative embodiments, hosted on a device accessible over the public Internet or other public network.

In embodiments, the command may contain one or more installation parameters including, for example, the criticality of the patch, the approximate time to download and install the patch, whether a reboot is required after installation, etc.

Figure 3:
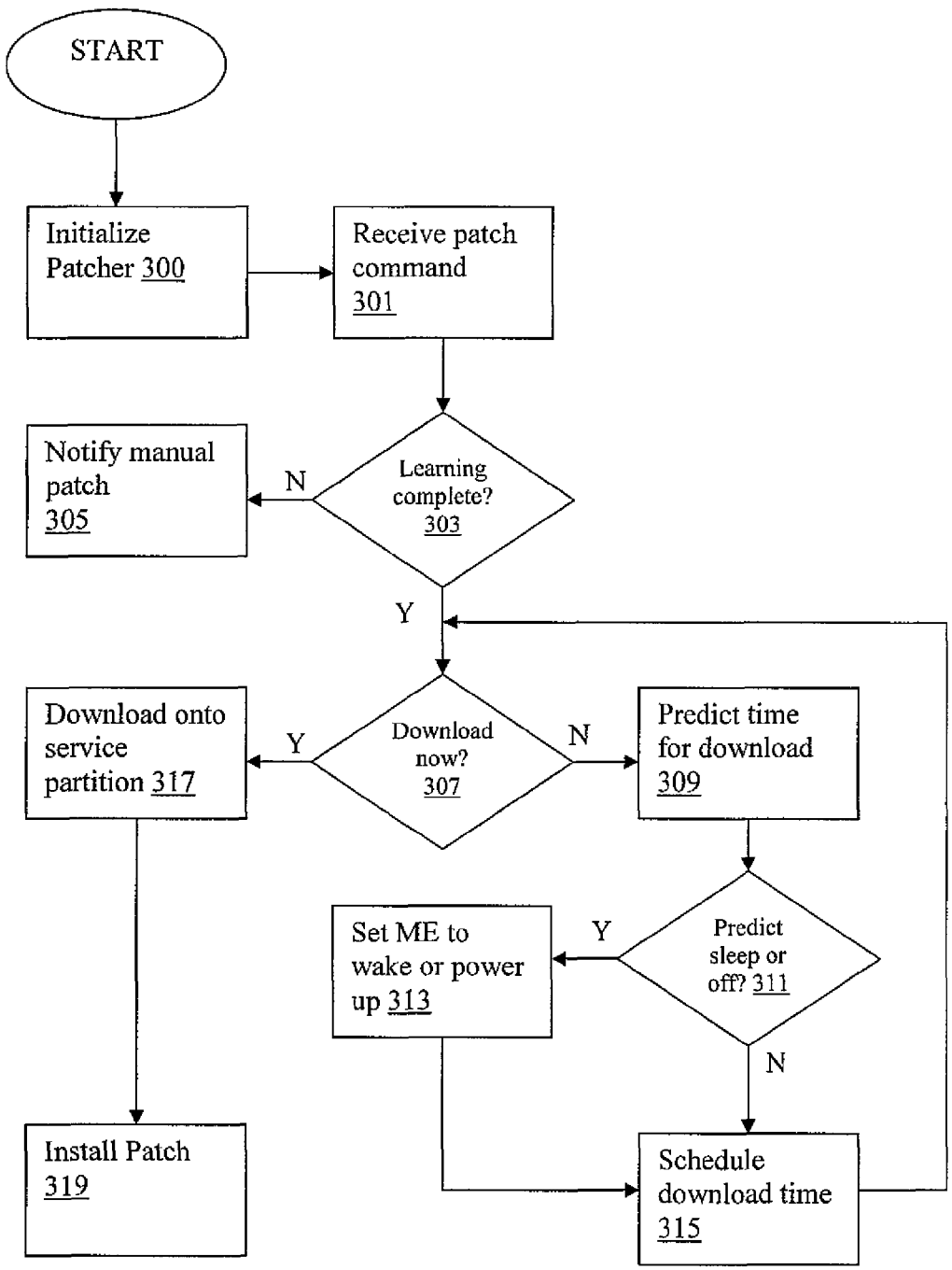
FIG. 3 shows a flow chart view of selected operations of the methods of various embodiments of the present invention in which software to be installed is downloaded by a client system.

FIG. 3 is a flow chart depicting a method of downloading a software patch onto a client system in accordance with various embodiments of the present invention. The client system and patcher may be initialized in 300 and a patch command may be received by the patcher in 301. In 303, the patcher determines whether or not an initial learning period has expired. If not, a notification may be sent to the administration console in 305 informing it that a manual patch may be necessary. If the learning period has expired, then—in 307—the patcher may determine whether or not it is appropriate to download the patch at the current time. This determination may, in embodiments, be based on a rule set developed by a profiler both during and after the initial learning period, or otherwise made available to the patcher. In other embodiments, the patcher may look not only at the rule set but also at the actual current client system utilization to determine if the current time is an appropriate time to download the software. In still other embodiments, the patcher may look only at the current client system utilization to determine if the patch should be downloaded at the current time. In embodiments, the profiler may look at only a subset of the rule set, for example, the predicted utilization of a network card but not, for example, the CPU and RAM utilization. In still other embodiments, the patcher may consult all aspects of the rule set to make its prediction.

In embodiments, the managed client may be periodically or constantly utilized by background tasks such as, for example, modeling tasks, simulation tasks, and/or media processing tasks as well as other tasks. These tasks, may, in some circumstances, cause the managed client to be active even while the user is away. In embodiments, user interactivity levels may be emphasized by the patcher in order to predict appropriate times to perform a software installation. These interactivity levels may be predicted by, for example, predicting the utilization of a keyboard, mouse, touchpad, and/or motion detector or other peripheral or input/output device, or group of peripherals or input/output devices.

If the current time is determined in 307 to not be an appropriate time to download the software file, the patcher may in 309 predict, using the rule set described above, a time when the client system utilization is likely to be below a certain level. The patcher may then, in 311 determine if the client system is likely to be in light sleep, deep sleep, or in a powered down state at the predicted time. In embodiments, the patcher may set in 313 appropriate states in a management engine of the client device to initiate an awake or power up of the client device if the predicted time is one when the client device is likely to be in sleep mode or powered down. In other embodiments, the patcher may set a state in the management engine as a precaution even if the client system device is not likely to be powered down or in a sleep state. In embodiments, the patcher may have the capability to wake the client system up from a sleep state using mechanisms such as, for example, Wake on Timer. In embodiments, the management engine may be configured to download the patch without waking the client, and may store the patch in a temporary space accessible to the client for later installation.

Continuing, the patcher may in 315 schedule the download and, at the scheduled time, go back to 307 to determine whether the current time is an appropriate time to initiate the download. If it is, the patcher may in 317 download the software file onto the service partition and go to 319 and install the software.

In embodiments, the software file may be downloaded in a single instance. In other embodiments, the software file may be downloaded in multiple passes depending on, for example, the size of the software file, the current client system utilization, the predicted client system usage patterns from the rule set, etc. In embodiments, the file may be scheduled to be downloaded at a time when the download is predicted by the rule set to be the least intrusive to the end user based on, for example, the predicted client system utilization, the size of the file, etc.

Figure 4:
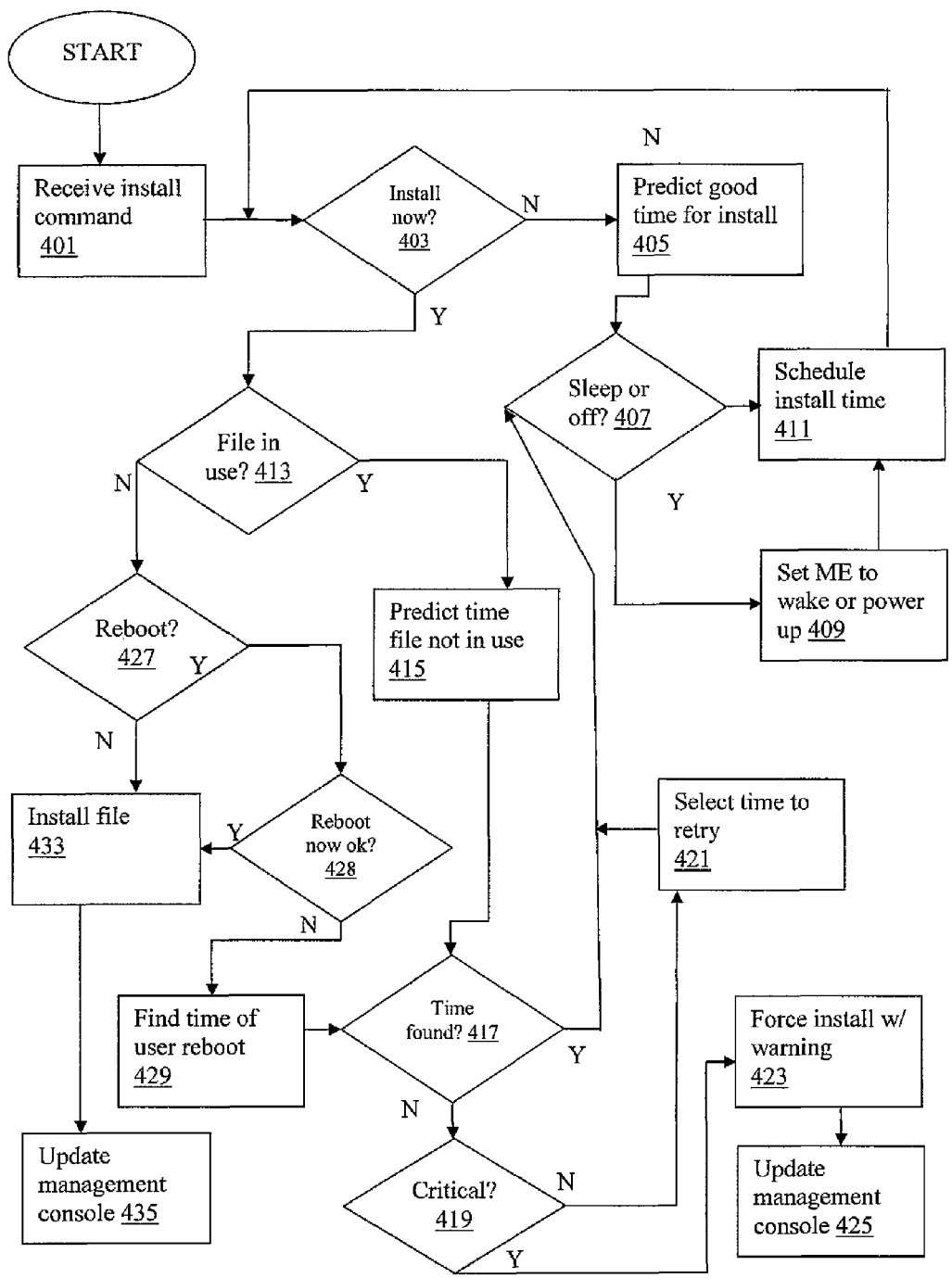
FIG. 4 shows a flow chart view of selected operations of the methods of various embodiments of the present invention in which downloaded software is installed on a client system.

FIG. 4 is a flow chart depicting a method of installing a software patch onto a client system in accordance with various embodiments of the present invention. In 401, the patcher may receive an instruction to install a software file and then may determine that the software file has been successfully downloaded onto the service partition of the client device. Next, In 403, the patcher determines whether it is appropriate to install the software at the current time. In embodiments, the patcher may determine, based on the rule set developed by a profiler, whether or not the current time is an appropriate time to download the file. In embodiments, the patcher may look not only at the rule set but also at the actual current client system utilization to determine if the current time is an appropriate one. In other embodiments, the patcher may look only at the current utilization to determine if the patch should be downloaded at the current time.

If the current time is determined not to be an appropriate time, the patcher may in 405 predict, using the rule set developed by the profiler, an appropriate time to install the software. In embodiments, this prediction may be based not only on the rule set, but on other factors such as the size of the file, estimated time to install etc. These factors may or may not be determined, in embodiments, by consulting installation parameters supplied by the installation command. As an example, depending on factors such as the size of the file and the time to install, as well as the typical client system utilization, the scheduled time may be in the middle of the night for a large install. Alternatively, it may be at a time during the workday when the client system is predicted to be idle for a short duration when the end user is, for example, usually taking a coffee break.

Next, in 407, the patcher may determine if the client system is predicted to be in a sleep or powered-down state at the predicted time. If so, the patcher may set, in 409, an appropriate state in a management engine to instruct the client system to awake or power up at the predicted time. In embodiments, the management engine may power the system down or put the system into a sleep state after install is complete. In other embodiments, the patcher may itself have the capability to wake the system from either a sleep state (standby) or deep sleep state (hibernate) through the use of mechanisms such as, for example, Wake on Timer.

The patcher next may schedule, in 411, the download at the predicted time. In embodiments, at the scheduled time, the patcher may then go back to 403 and determine if the current time—which may at that point also be the scheduled time—is an appropriate time to schedule the install. In other embodiments, the patcher may force an install at the scheduled time without determining at the scheduled time, if the current time is an appropriate time to install.

If the scheduled time is determined by the patcher to be an appropriate time to install, the patcher may next determine in 413 if the file to be patched is currently in use. If it is, then the patcher may attempt to predict a time, using the rule set, when the file will not be in use in 415. If the patcher, in 417, determines that it is able to predict such a time, then it may go back to 407 discussed above.

If the patcher, in 417, determines that it is unable to predict such a time, then the patcher may in 419 determine whether or not the install is critical. In embodiments, the determination that the install is critical may be made based on an installation parameter supplied by the install instruction which may or may not be provided by the management console.

If the patch is not determined to be critical, then the patcher may in 421 select a time to retry the install and set an appropriate state in a management engine to awake or power up the client system at a future time. At that future time, the patcher may go back to 403 and begin the process over again. In embodiments, the time selected to retry the install may be determined by a preset configuration setting in the patcher which may or may not be configurable by the user or by use of a management console. In embodiments, the patcher may select the time to retry based on other installation parameters supplied by the management console such as, for example, the size of the file and the estimated time to install, etc. In embodiments, the time selected to retry may be determined by consulting the rule set for a time, for example, when the client system's utilization is predicted to be below a certain level.

If, in 419, the patch is determined to be critical, the patcher may then in 423 initiate a forced update with a warning to the user that an update is about to take place. In embodiments, the patcher may set a timer based on the degree of criticality of the patch and may install when the timer expires. After the software file is installed, the patcher may update a management console with information that the install has completed in 425.

Returning now to 413, the patcher may determine that the file to be patched is not in use and may then determine, in 427, whether a reboot is required once the install is completed. In embodiments, the patcher may determine if a reboot is required based on an installation parameter supplied by the install instruction which may or may not be provided by a management console. If a reboot is required, the patcher may, in 428, determine if a reboot at the current time is appropriate. This determination may be made, in embodiments, based on the current utilization, the rule set, time of day, etc.

If a reboot is ok, the patcher may install the file in 433. If a reboot is not appropriate, the patcher may predict a time for installing just before a user-initiated reboot in 429. The patcher then goes back to 417 and determines if such a time can be found. See above for s the patcher may take if no such time is found.

If a time just before a user-initiated reboot can be found, the patcher may then go to 407 described above.

Returning to 427, the patcher may determine that no reboot is required. If so, the patcher may, in 433, install the software file and then it may update the management console in 435 with a message indicating the installation has completed.

Figure 5:
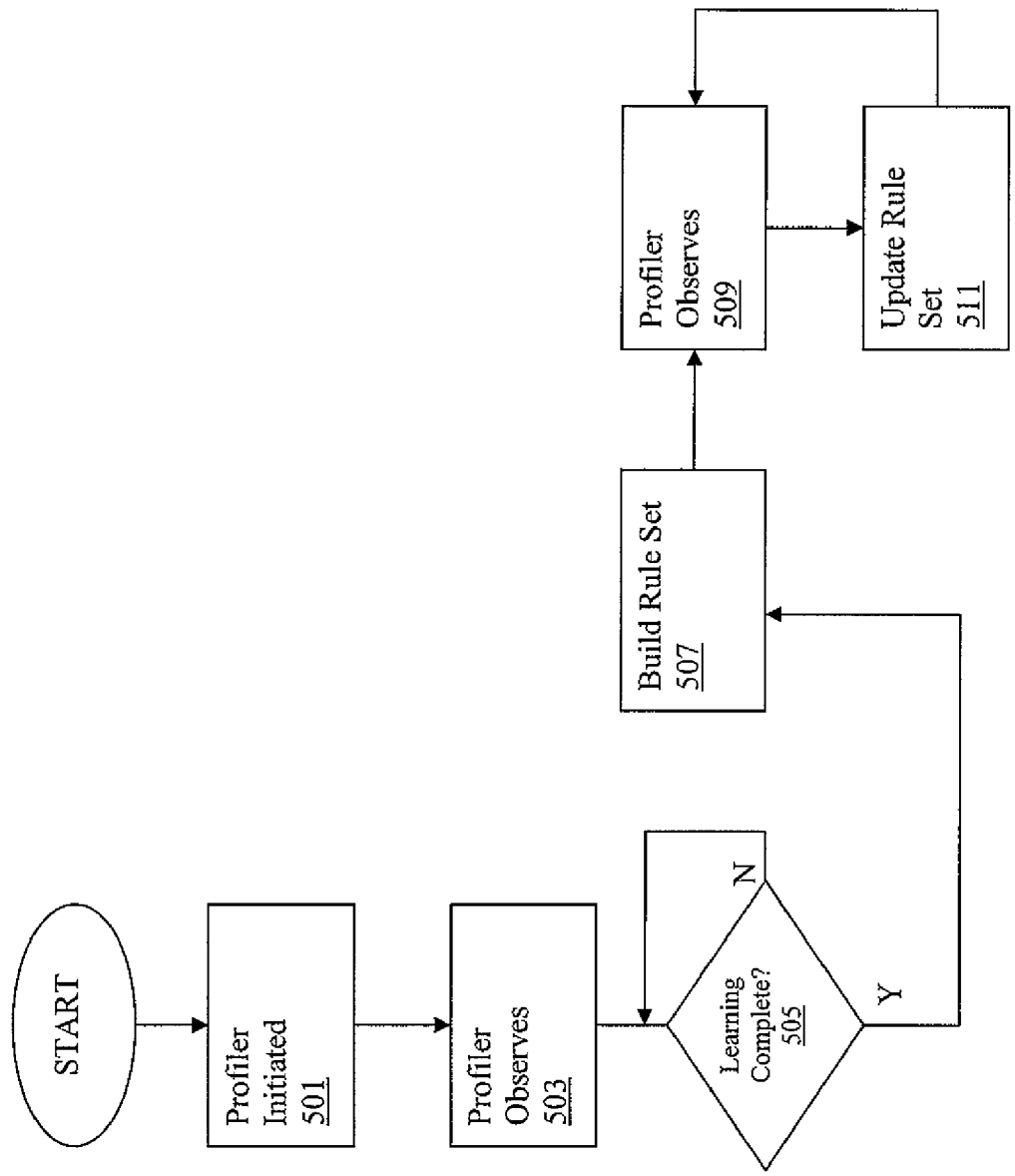
FIG. 5 shows a flow chart view of selected operations of the methods of various embodiments of the present invention in which a learning algorithm is employed to model a managed client's utilization.

FIG. 5 illustrates a learning algorithm in accordance with various embodiments of the present invention. In 501, a patcher and a profiler may be initiated on a managed client system. In 503, the profiler may observe various incidents relating to the utilization of the client system. In embodiments, the profiler may record the incidents when the managed client is powered up, when it is powered down, when it goes into a soft sleep mode, when it enters a deep sleep mode, and when it awakes from either soft sleep or deep sleep. In embodiments, the profiler may observe by listening to various power up, power down, and sleep messages from an operating system running on the managed client.

In embodiments, the profiler may, in 505, observe the managed client hardware utilization at periodic intervals and record these observations. Monitored hardware utilization may include, but may not be limited to, CPU utilization, RAM utilization, network card utilization, and hard disk drive utilization. Other hardware components the profiler may observe include diskette drives, compact disk read only memory drives (CD-ROM) including writing and re-writing versions, digital video disk drives (DVD) including writing and re-writing versions, and modems of various types In embodiments, the profiler may observe measurements of active user interaction with managed client. To this end it may, for example, observe and record the amount of activity associated with input/output devices or peripherals such as, for example, keyboard, mouse, touchpad, and/or motion detector. In embodiments, it may observe the level of user interaction with other input/output devices or peripherals not listed above. In embodiments, it may observe and record the activity levels of a group of peripherals or input/output devices.

In embodiments, the profiler may also observe and record application usage which may include the numbers of active applications and/or the number of active processes over time. In embodiments, the profiler may observe the hardware utilization by accessing the CPU, hard disk drive, RAM, and network card directly via appropriate interfaces such as, but not limited to, perf mon type interfaces.

In embodiments, the profiler may observe and record the utilization of components not described above. In embodiments, it may observe and record the utilization of only a subset of the hardware components listed above. In embodiments, the profiler may observe and record multiple components of like type such as, for example, multiple CPUs, network cards, etc.

In 505, the profiler determines if an initial learning period has expired. If it has not, the profiler may go back to 503 and may continue to observe the managed client. This process may iterate until the learning period expires. The time length of the learning cycle may be a configurable administrative policy set by a user on the managed client, set by an administrator on a management console, or it may be set during manufacturing of the managed client be and nonconfigurable after that point. In various embodiments, the time length of the learning cycle may be pre-set during manufacturing but configurable at a later time. In other embodiments, the length of time may be set dynamically depending on, for example, the amount of variation in utilization of the managed client observed by the profiler during an initial phase of the learning cycle.

If the learning period has expired, the profiler may in 507 build a rule set which may include usage patterns such as ranges of times when the utilization levels of the CPU, RAM, network card, and hard disk drive are above a certain high level; ranges of times when the utilization of those components are below another low level, and ranges of time when the utilization of those components are between the two levels. The rule set may also include ranges of times when the managed client is powered down; when it is powered up; when it is in soft sleep mode; and when it is in deep sleep mode. The rule set may also include ranges of times when application usage is above a certain high level, ranges of times when it is below another low level, and ranges of times when application usage is between the two levels.

In embodiments, the rule set may include, for example, ranges of times when user interactivity is above a certain high level, a range of times when user interactivity is between a range, and a range of time when user interactivity is beneath another low level. In embodiments, user interactivity may be modeled by the amount of activity associated with input/output devices or peripherals such as, for example, the keyboard, mouse, touchpad, and/or motion detector. In embodiments, it may include the level of activity associated with input/output devices or peripherals not listed above. In embodiments, it may include the activity levels of a group of peripherals.

In embodiments, a rule set may be user-specific; the profiler may observe, record and build a rule set based upon each user's individualized usage of and/or interaction with the client system. This may be important in computing environments where multiple users share the same computer, for example in a call center. In embodiments, a user's individualized rule set may be migrated to another client system if and when the user logs onto a different client system.

As will be apparent to one of ordinary skill in the art, the rule set may be, in embodiments based upon and include utilization patterns other than those listed above. In other embodiments, the rule set may be based on only a subset of the usage patterns described above.

Next, in 509, the profiler may continue to observe the client system utilization as well as update the rule set in 511 as changes in utilization patterns are detected. This process may iterate indefinitely for as long as the profiler is left running on the managed client. In other embodiments, the profiler may be turned off after a certain time.

In embodiments, the rule set may be reset at periodic intervals such as, for example, daily, weekly, or monthly. In this way, changes in user behavior may be more accurately reflected on an ongoing basis.

Figure 6:
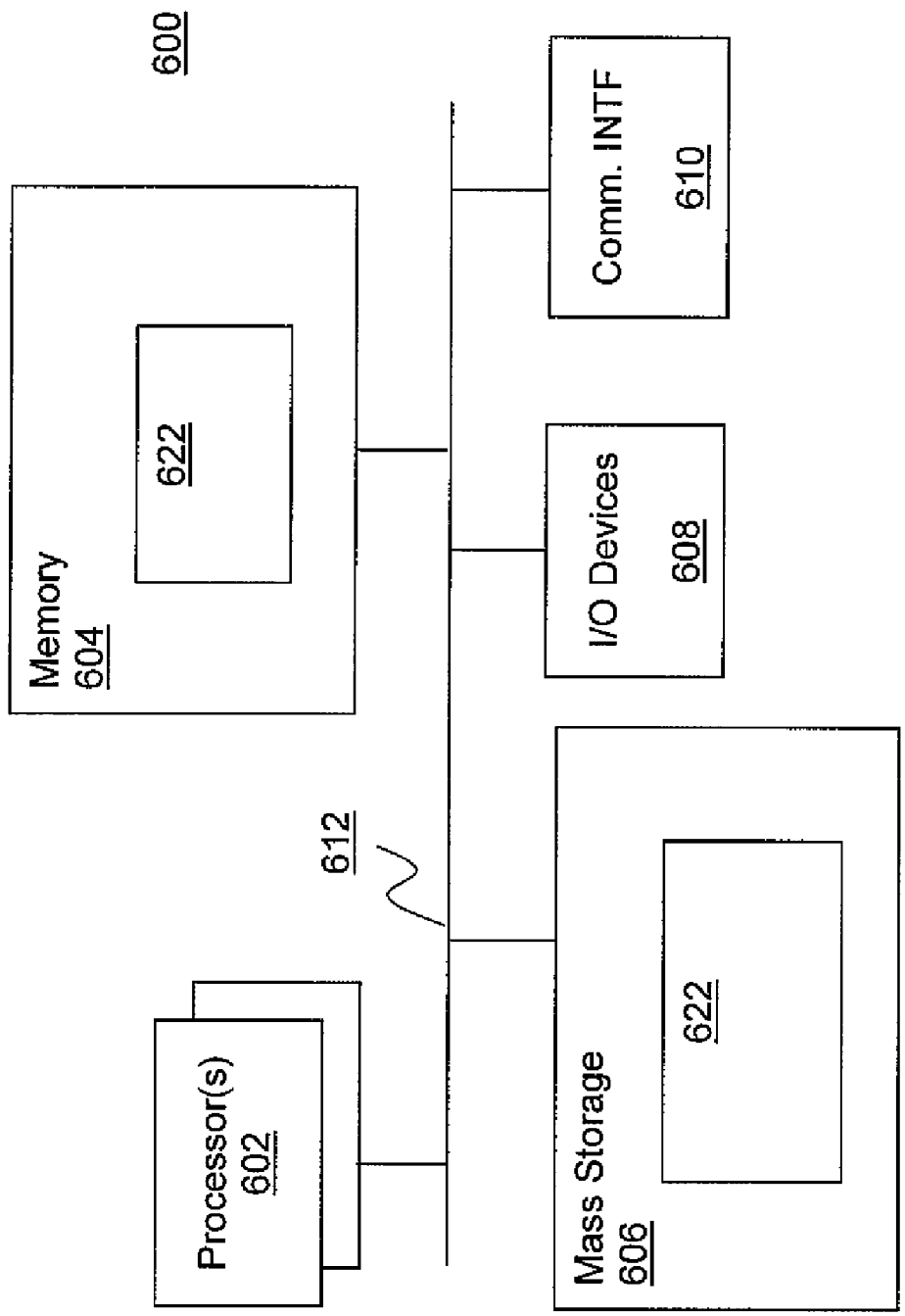
FIG. 6 illustrates an example computer system suitable for use to practice various embodiments of the present invention.

FIG. 6 illustrates an example computer system suitable for use to practice various embodiments of the present invention. As shown, computing system 600 includes a number of processors or processor cores 602, and system memory 604. For the purpose of this application, including the claims, the terms "processor" and "processor cores" may be considered synonymous, unless the context clearly requires otherwise. Additionally, computing system 600 includes mass storage devices 606 (such as diskette, hard drive, compact disc read only memory (CDROM) and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown).

Each of these elements performs its conventional functions known in the art. In particular, system memory 604 and mass storage 606 may be employed to store a working copy and a permanent copy of the programming instructions implementing one or more of the various components, such as the patcher, the profiler, the patching proxy agent, and so forth, herein collectively denoted as 622. The various components may be implemented by assembler instructions supported by processor(s) 602 or high-level languages, such as C, that can be compiled into such instructions.

The permanent copy of the programming instructions may be placed into permanent storage 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The constitution of these elements 602-612 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method comprising:
receiving, by a computer system, an instruction to install a software on the computer system, the instruction including information related to estimated amount of time needed to download and install the software, whether restart of the computer system is to be required after the installation, and a level indicative of criticality of the software;
downloading, by the computing system, the software to be installed at a first time based at least in part on a first prediction by the computer system that the computer system's utilization at the first time is to be below a first utilization level;
installing, by the computer system, the software at a second time based at least in part on a second prediction by the computer system that the computer system's utilization at the second time is to be below a second utilization level, and the first and the second predictions are adaptively performed based on a rule set including aggregated usage patterns of the computer system.

2. The method of claim 1, wherein the adaptive prediction comprises modeling the computer system's utilization by a learning algorithm.

3. The method of claim 2 wherein the model includes at least one usage pattern selected from the group consisting of a range of times when the computer system is on, a range of times when the computer system is off, a range of times when the computer system is in deep sleep, a range of times when the computer system is in soft sleep, a range of times when the central processor unit utilization is above a level, a range of times when the central processor unit utilization is between a range, a range of times when the central processor unit utilization is below a level, a range of times when the computer system memory utilization is above a level, a range of times when the computer system memory utilization is between a range, a range of times when the computer system memory utilization is below a level, a range of times when the computer system network utilization is above a level, a range of times when the computer system network utilization is between a range, a range of times when the computer system network utilization is below a level, a range of times when user interactivity is above a level, a range of times when user interactivity is between a range, and a range of times when user interactivity is below a level.

4. The method of claim 2, further comprising the learning algorithm collecting data relating to at least one metric of the computer system's utilization to model the computer system's utilization.

5. The method of claim 4 wherein the at least one metric is selected from the group consisting of incidents of power up, incidents of power down, incidents of soft sleep, incidents of deep sleep, incidents of reboot, central processing unit utilization, hard disk utilization, network utilization, and memory utilization.

6. The method of claim 4 further comprising the learning algorithm learning for an initial learning period of a pre-set length of time.

7. The method of claim 1 wherein the determining of the selected time is further based on the computer system's current utilization.

8. The method of claim 1 wherein the determining of the selected time is further based on the received installation instruction including information related to estimated amount of time needed to download and install the software, whether restart of the computer system is to be required after the installation, and a level indicative of criticality of the software.

9. The method of claim 1 wherein the determining of the selected time is further based on whether the installation involves patching a file in use by the computer system.

10. The method of claim 1 further comprising:
scheduling, by the computer system, a wake up of the computer system at the selected time if the computer is predicted to be in an off state, a soft sleep state, or a deep sleep state at the selected time.

11. The method of claim 1 further comprising:
setting, by the computer system, states of a management microcontroller of the computer system, the management microcontroller being separate and distinct from a central processing unit of the computer system, to enable the management microcontroller to wake the central processing unit up at the selected time, the selected time being when the central processing unit is predicted to be in an off state, a soft sleep state, or a deep sleep state.

12. An apparatus comprising:
a processor; and
an installation module operated by the processor and adapted to:
receive an instruction to install a software on a computer system, the instruction including information related to estimated amount of time needed to download and install the software, whether restart of the computer system is to be required after the installation, and a level indicative of criticality of the software;
download the software to be installed at a first time based at least in part on a first prediction by the apparatus that the utilization of the computer system at the first time is to be below a first utilization level;
installing the software at a second time based at least in part on a second prediction by the apparatus that the computer system's utilization at the second time is to be below a second utilization level, and the first and second predictions are adaptively performed, said adaptive prediction including modeling the computer system's utilization by a learning algorithm.

13. The apparatus of claim 12, wherein the learning algorithm is adapted to collect data relating to at least one metric of the computer system's utilization to model the computer system's utilization.

14. The apparatus of claim 13, wherein the at least one metric is selected from the group consisting of incidents of power up, incidents of power down, incidents of soft sleep, incidents of deep sleep, incidents of reboot, central processing unit utilization, hard disk utilization, network utilization, and memory utilization.

15. The apparatus of claim 12 wherein the selected time is further determined based on the received installation instruction including information related to estimated amount of time needed to download and install the software, whether restart of the computer system is to be required after the installation, and a level indicative of criticality of the software.

16. The apparatus of claim 12 wherein the selected time is further determined based on whether the installation involves patching a file in use.

17. The apparatus of claim 12 wherein the installation module is further adapted to schedule a wake up of the computer system at the selected time if the computer is predicted to be in an off state, a soft sleep state, or a deep sleep state at the selected time.

18. An article of manufacture comprising:
a tangible computer-accessible storage medium; and
a plurality of programming instructions stored on the storage medium, and designed to program an apparatus, wherein the programming instructions, when executed by the apparatus, implement an installation module on the apparatus to:
receive an instruction to install a software on a computer system, the instruction including information related to estimated amount of time needed to download and install the software, whether restart of the computer system is to be required after the installation, and a level indicative of criticality of the software;
download the software to be installed at a first time based at least in part on a first prediction by the apparatus that the utilization of the computer system at the first time is to be below a first utilization level;
install the software on the apparatus at a second time based at least in part on a second prediction by the apparatus that the computer system's utilization at the second time is to be below a second utilization level, and the first and the second predictions are adaptively performed, said adaptive prediction including modeling the computer system's utilization by a learning algorithm, the learning algorithm adapted to collect data relating to at least one metric of the computer system's utilization to model the computer system's utilization.

19. The article of claim 18 wherein the model includes at least one usage pattern selected from the group consisting of a range of times when the computer system is on, a range of times when the computer system is off, a range of times when the computer system is in deep sleep, a range of times when the computer system is in soft sleep, a range of times when the central processor unit utilization is above a level, a range of times when the central processor unit utilization is between a range, a range of times when the central processor unit utilization is below a level, a range of times when the computer system memory utilization is above a level, a range of times when the computer system memory utilization is between a range, a range of times when the computer system memory utilization is below a level, a range of times when the computer system network utilization is above a level, a range of times when the computer system network utilization is between a range, and a range of times when the computer system network utilization is below a level.

20. The article of claim 18 wherein the selected time is further determined based on the received installation instruction including information related to estimated amount of time needed to download and install the software, whether restart of the computer system is to be required after the installation, and a level indicative of criticality of the software.

21. A system comprising:
a processor;
a mass storage device coupled to the processor, the mass storage device storing a plurality of programming instructions designed to implement an installation module, the installation module adapted to:
receive an instruction install a software, the instruction including information related to estimated amount of time needed to download and install the software, whether restart of a computer system is to be required after the installation, and a level indicative of criticality of the software;
download the software to be installed at a first time based at least in part on a first prediction by the apparatus that the utilization of the computer system at the first time is to be below a first utilization level;
install the software at a second time based at least in part on a second prediction by the apparatus that the computer system's utilization at the second time is to be below a second utilization level, and the first and the second predictions are adaptively performed, said adaptive prediction including modeling the computer system's utilization by a learning algorithm, the learning algorithm adapted to collect data relating to at least one metric of the computer system's utilization to model the computer system's utilization; and a management microcontroller coupled to the processor, the management microcontroller adapted to receive from the installation module states to enable the management microcontroller to wake the processor up at the selected time.

22. The system of claim 21 wherein the at least one metric is selected from the group consisting of incidents of power up, incidents of power down, incidents of soft sleep, incidents of deep sleep, incidents of reboot, central processing unit utilization, hard disk utilization, network utilization, and memory utilization.

23. The system of claim 21 wherein the model includes at least one usage pattern selected from the group consisting of a range of times when the computer system is on, a range of times when the computer system is off, a range of times when the computer system is in deep sleep, a range of times when the computer system is in soft sleep, a range of times when the central processor unit utilization is above a level, a range of times when the central processor unit utilization is between a range, a range of times when the central processor unit utilization is below a level, a range of times when the computer system memory utilization is above a level, a range of times when the computer system memory utilization is between a range, a range of times when the computer system memory utilization is below a level, a range of times when the computer system network utilization is above a level, a range of times when the computer system network utilization is between a range, and a range of times when the computer system network utilization is below a level.

24. The system of claim 21 wherein the installation module is further designed to set states of the management microcontroller to enable the management microcontroller to wake the processor up at the selected time, the selected time being when the processor is predicted to be in an off state, a soft sleep state, or a deep sleep state.

* * * * *

UNITED STATES PATENT AND TRADEMARK OFFICE
CERTIFICATE OF CORRECTION

| | | |
|---|---|---|
| PATENT NO. | : 7,802,083 B2 | Page 1 of 1 |
| APPLICATION NO. | : 11/613317 | |
| DATED | : September 21, 2010 | |
| INVENTOR(S) | : Gurumoorthy et al. | |

It is certified that error appears in the above-identified patent and that said Letters Patent is hereby corrected as shown below:

Column 12, line 50, Claim 21, ...instruction install... should read --instruction to install--

Signed and Sealed this
Twenty-fifth Day of January, 2011

David J. Kappos
*Director of the United States Patent and Trademark Office*